(12) United States Patent
Hoppe et al.

(10) Patent No.: US 9,822,899 B2
(45) Date of Patent: Nov. 21, 2017

(54) ARRANGEMENT OF AN ELECTROMAGNET FOR CONTROLLING A CENTRAL VALVE

(71) Applicant: Schaeffler Technologies AG & Co. KG, Herzogenaurach (DE)

(72) Inventors: Jens Hoppe, Erlangen (DE); Markus Kinscher, Lauf a.d. Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/892,499

(22) PCT Filed: Mar. 12, 2014

(86) PCT No.: PCT/DE2014/200121
§ 371 (c)(1),
(2) Date: Nov. 19, 2015

(87) PCT Pub. No.: WO2014/190982
PCT Pub. Date: Dec. 4, 2014

(65) Prior Publication Data
US 2016/0116079 A1    Apr. 28, 2016

(30) Foreign Application Priority Data
May 28, 2013 (DE) .................. 10 2013 209 862

(51) Int. Cl.
*F16K 31/06* (2006.01)
*F01L 1/344* (2006.01)
*H01F 7/17* (2006.01)

(52) U.S. Cl.
CPC .......... *F16K 31/0675* (2013.01); *F01L 1/344* (2013.01); *H01F 7/17* (2013.01);
(Continued)

(58) Field of Classification Search
CPC ............. F16K 31/0655; F16K 31/0668; F16K 31/0675; F16K 27/029; F16K 31/52;
(Continued)

(56) References Cited

U.S. PATENT DOCUMENTS 3,707,992 A * 1/1973 Ellison ................ F16K 31/0627
137/625.65
3,916,934 A * 11/1975 Koenig .................. G05D 16/10
137/115.03
(Continued)

FOREIGN PATENT DOCUMENTS

DE    102006027349    12/2007
DE    102007015333    10/2008
(Continued)

*Primary Examiner* — Matthew W Jellett
(74) *Attorney, Agent, or Firm* — Davidson, Davidson & Kappel, LLC

(57) ABSTRACT

An arrangement of an electromagnet (6) for controlling a central valve (2) is provided. A thrust pin (4) is coupled to the electromagnet (6) and can be moved along a first axis (A) in such a way that a control piston (1) of the central valve (2) can be displaced along a second axis (B) in a central valve housing (8) by the movable thrust pin (4). The first axis (A) of the thrust pin (4) extends parallel to and at a radial spacing (10) relative to the second axis (B) of the control piston (1).

8 Claims, 3 Drawing Sheets

(52) U.S. Cl.
CPC ............... *F01L 2001/3443* (2013.01); *F01L 2001/34433* (2013.01)

(58) Field of Classification Search
CPC ............ F16K 31/523; F01L 2001/3443; F01L 2001/34433; H01F 7/17
USPC .................................................. 251/129.15
See application file for complete search history.

(56) References Cited

U.S. PATENT DOCUMENTS

| | | | |
|---|---|---|---|
| 4,535,731 A | | 8/1985 | Banfi |
| 5,488,973 A | * | 2/1996 | Yamamuro ............ B60T 8/3635 137/625.65 |
| 6,148,853 A | * | 11/2000 | Wang ..................... B62D 5/062 137/493.6 |
| 7,389,756 B2 | * | 6/2008 | Hoppe ..................... F01L 1/34 123/90.15 |
| 2011/0000447 A1 | | 1/2011 | Hoppe et al. |
| 2016/0125990 A1 | * | 5/2016 | Strigerwald ........ F01L 13/0036 335/229 |

FOREIGN PATENT DOCUMENTS

| | | |
|---|---|---|
| DE | 102008006377 | 7/2009 |
| DE | 102010050813 | 5/2012 |
| DE | 102011080421 | 2/2013 |
| JP | 2005264950 | 9/2005 |

* cited by examiner

ARRANGEMENT OF AN ELECTROMAGNET FOR CONTROLLING A CENTRAL VALVE

The present invention relates to an arrangement of an electromagnet for controlling a central valve. A thrust pin is coupled to the electromagnet and is movable along a first axis in such a way that a control piston of the central valve is displaceable along a second axis in a central valve housing with the aid of the movable thrust pin.

BACKGROUND OF THE INVENTION

In internal combustion engines, camshafts are used to actuate the so-called gas exchange valves. The cams of the camshafts usually rest against cam followers. When a camshaft is set in rotation, the cams thus roll against the cam followers, which in turn actuate the gas exchange valves. The angular shift of the camshaft relative to a crankshaft in order to achieve optimized control times for different speeds and load states is referred to as camshaft adjustment. One design variant of a camshaft adjuster operates, for example, according to the known swivel motor principle.

The camshaft adjuster is in this case mounted fixedly on the camshaft. A central valve controls the exchange of oil between the camshaft adjuster and the oil circuit of the internal combustion engine. The access openings and/or the outlets of the central valve are formed in a central valve housing. A control piston is guided in an interior of the central valve housing. The control piston is designed as a cylindrical body having a cavity. The control piston is coupled to an electromagnet by way of a thrust pin, the electromagnet being configured to move the control piston axially in the central valve housing. This is described, for example, in German unexamined publications DE 10 2011 080 421 A1, DE 10 2010 050 813 A1 and DE 10 2006 027 349 A1.

In the known central valve applications, attempts are made to install the two sliding partners, i.e., the thrust pin and the control piston, without any offset. A contact surface between the control piston and the thrust pin is thus formed in a centric manner on the control piston of the central valve. Due to this centric or slightly eccentric (within the scope of the permissible positional deviation) alignment of the two sliding partners, no relative movement (in the case of a centric position) or only a slight relative movement occurs between the control piston and the thrust pin. During the arising relative movement, the control piston rotates and the thrust pin is stationary. The low or lacking sliding speed of the sliding partners relative to one another prevents or hinders the buildup of a stable hydrodynamic lubricating film and thus fosters wear on the sliding pairing due to a lack of lubrication and increased friction. Dry friction thus occurs, whereby in particular the surface roughness of the control piston results in wear of the thrust pin.

SUMMARY OF THE INVENTION

It is an object of the present invention to provide an arrangement of an electromagnet for controlling a central valve in such a way that a stable hydrodynamic lubricating film is produced and wear on a contact surface of the sliding partners control piston and thrust pin is greatly minimized or prevented.

The present invention provides an electromagnet for controlling a central valve, a thrust pin is coupled to the electromagnet and is movable along a first axis in such a way that a control piston of the central valve is displaceable along a second axis in a central valve housing with the aid of the movable thrust pin.

The first axis of the thrust pin extends in parallel to and at a radial distance with respect to the second axis of the control piston.

Due to this radial distance, or offset, of the first axis relative to the second axis, a relative movement is formed between a contact surface of the control piston and a front face of the thrust pin. In particular, during operation, the first axis of the thrust pin describes a circular path on the contact surface of the control piston.

In order to achieve the installation position, i.e., the radial distance according to the present invention of the first axis with respect to the second axis of the arrangement, the electromagnet of the thrust pin is therefore installed deliberately eccentrically relative to the central valve and beyond the assembly accuracy of routine positional deviations known from the prior art, so that the first axis of the thrust pin extends in parallel to and at a distance with respect to the second axis of the control piston.

The relative movement, resulting from the installation position, between the contact surface of the control piston and the front face of the thrust pin, i.e., due to the circular path of the thrust pin on the contact surface of the control piston, forms a stable hydrodynamic lubricating film due to the high sliding speed of the thrust pin on the control piston. Friction between the sliding partners, composed of control piston and thrust pin, may be reduced by this stable hydrodynamic lubricating film. As a result, wear on the contact surface of the sliding partners is reduced or prevented.

In particular, the front face of the thrust pin is smaller than the contact surface of the control piston.

Exemplary embodiments of the present invention and the advantages thereof will be explained in greater detail below on the basis of the appended figures. The proportions in the figures do not always correspond to the real proportions, since some shapes are simplified and other shapes are shown on an enlarged scale in comparison to other elements for the sake of better illustration.

DETAILED DESCRIPTION

Figure 1:
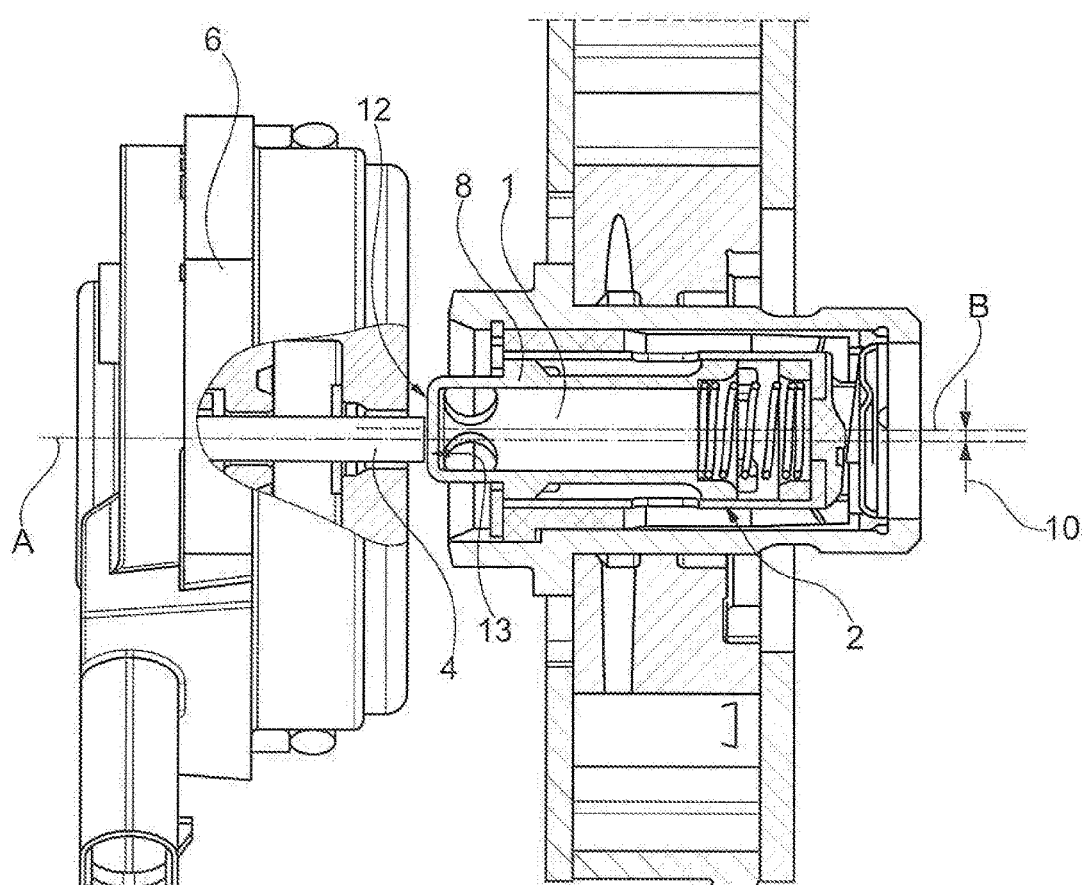
FIG. 1 shows a longitudinal section of the arrangement according to the present invention of an electromagnet for controlling a central valve, in the installed state.

Identical reference numerals are used for elements of the present invention which are identical or which act in an identical manner. Furthermore, for the sake of clarity, the individual figures show only reference numerals which are necessary to describe the figure in question. The illustrated specific embodiments are merely examples of how the arrangement according to the present invention of an electromagnet for controlling a central valve may be configured, and thus do not represent any final limitation of the present invention.

FIG. 1 shows a longitudinal section of the arrangement according to the present invention of an electromagnet 6 for controlling a central valve 2, in the installed state. Here, a thrust pin 4 is coupled to electromagnet 6 so that thrust pin 4 is movable along a first axis A. Thrust pin 4 acts, in its axial movement, on a control piston 1 of central valve 2. Control piston 1 is displaceable along a second axis B in a central valve housing 8 with the aid of movable thrust pin 4.

According to the present invention, first axis A of thrust pin 4 extends in parallel to and at a radial distance 10 from second axis B of control piston 1.

Figure 2:
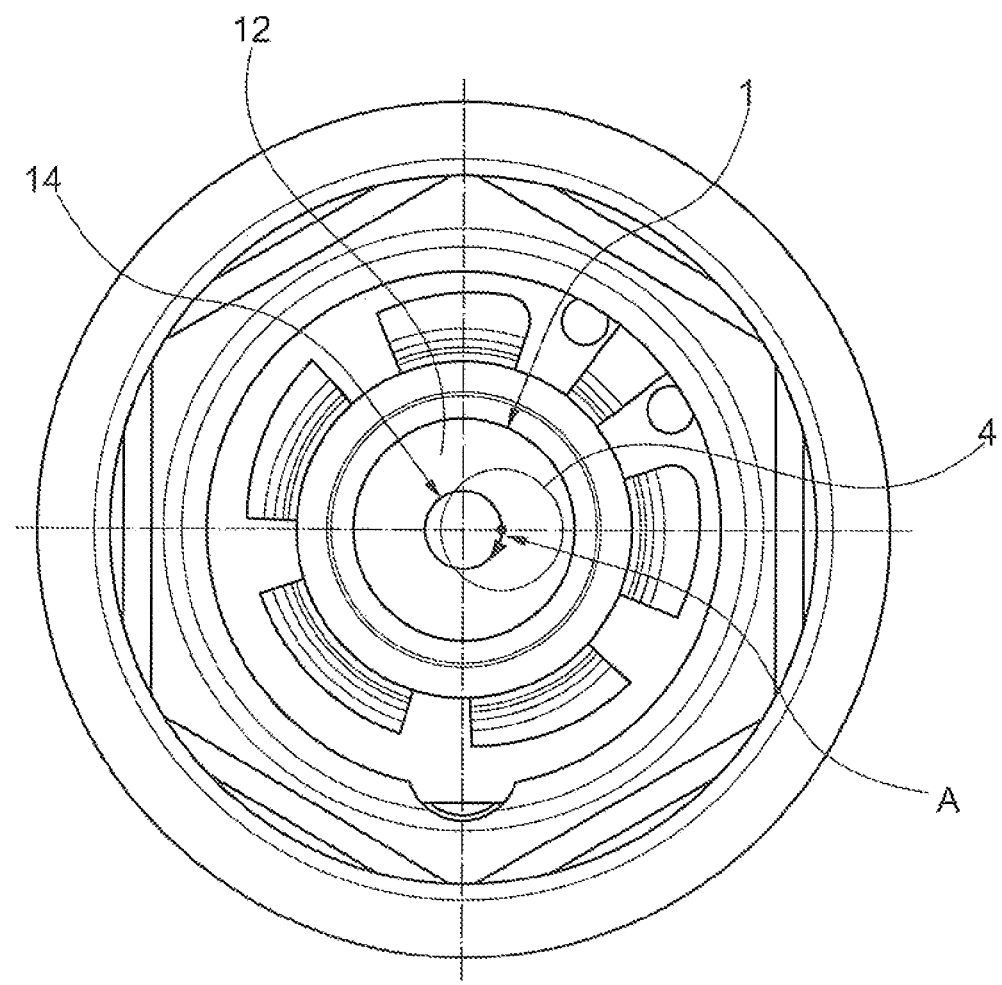
FIG. 2 shows a top view of the arrangement according to the present invention in a contact situation of the thrust pin and the control piston.

This spaced arrangement of first axis A relative to second axis B thus makes it possible, during operation, for a relative speed to form between a contact surface 12 of control piston 1 and a front face 13 of thrust pin 4. Then, in a contact situation of thrust pin 4 and control piston 1, as shown in FIG. 2, first axis A of thrust pin 4 describes a circular path 14 on contact surface 12 of control piston 1.

Figure 3:
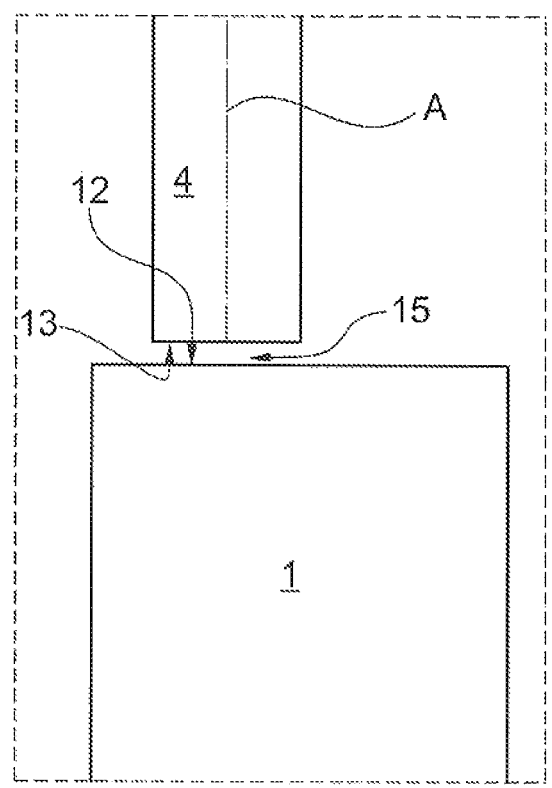
FIG. 3 shows a schematic view of the area in which the thrust pin and the control piston cooperate during operation and produce a hydrodynamic lubricating film.

In order to achieve this arrangement, in particular the relative movement between thrust pin 4 and control piston 1, electromagnet 6 of thrust pin 4 is installed eccentrically relative to central valve 2 so that first axis A of thrust pin 4 extends in parallel to second axis B of control piston 1 and at a distance from second axis B. Due to this targeted eccentric installation of electromagnet 6 of thrust pin 4 relative to central valve 42 beyond the otherwise customary permitted positional deviations of the components relative to one another, the sliding speed between control piston 1 and thrust pin 4 is significantly increased. As schematically shown in FIG. 3, this results in the formation of a hydrodynamic lubricating film 15 between control piston 1 and thrust pin 4. As a result, the wear on the sliding partners composed of contact surface 12 of control piston 1 and front face 13 of thrust pin 4 is reduced or prevented. In particular, as also shown in FIG. 3, front face 13 of thrust pin 4 is smaller than contact surface 12 of control piston 1.

LIST OF REFERENCE NUMERALS

1 control piston
2 central valve
4 thrust pin
6 electromagnet
8 central valve housing
10 distance
12 contact surface of control piston
13 front face of thrust pin
14 circular path
15 hydrodynamic lubricating film
A first axis
B second axis

What is claimed is:

1. An arrangement of an electromagnet for controlling a central valve, the arrangement comprising:
   the electromagnet; and
   a thrust pin coupled to the electromagnet and axially movable along a first axis defined by a center of the thrust pin in such a way that a control piston of the central valve is axially displaceable along a second axis defined by a center of the control piston in a central valve housing by the movable thrust pin contacting the control piston,
   the first axis of the thrust pin extending in parallel to and at a radial distance with respect to the second axis of the control piston;
   wherein the thrust pin is configured such that relative movement between the thrust pin and the control piston generates a relative movement of the first axis in relation to the second axis that causes a contact surface of the control piston to move along a front face of the thrust pin; and
   wherein the thrust pin is arranged and configured such that, during operation, the first axis of the thrust pin undergoes relative movement with respect to the second axis in a circular path at an intersection of the first axis and the contact surface of the control piston.

2. The arrangement as recited in claim 1 wherein the electromagnet coupled to the thrust pin is installed eccentrically relative to the central valve so that the first axis of the thrust pin extends in parallel to and at a distance with respect to the second axis of the control piston.

3. The arrangement as recited in claim 1 wherein the thrust pin is arranged and configured such that the relative movement generates a hydrodynamic lubricating film between the contact surface of the control piston and the front face of the thrust pin from adjacent fluid.

4. The arrangement as recited in claim 1 wherein a front face of the thrust pin is smaller than the contact surface of the control piston.

5. A combination of a central valve and arrangement of an electromagnet for controlling the central valve, the combination comprising:
   a central valve having a control piston and a central valve housing;
   an electromagnet; and
   a thrust pin coupled to the electromagnet and movable along a first axis defined by a center of the thrust pin in such a way that the control piston of the central valve is displaceable along a second axis defined by a center of the control piston in the central valve housing by the movable thrust pin contacting the control piston,
   the first axis of the thrust pin extending in parallel to and at a radial distance with respect to the second axis of the control piston; wherein
   the thrust pin and control piston are arranged and configured with respect to each other such that relative movement between the thrust pin and the control piston generates a relative movement of the first axis in relation to the second axis that causes a contact surface of the control piston to move along a front face of the thrust pin; and
   wherein the thrust pin and control piston are arranged and configured with respect to each other such that, during operation, the first axis of the thrust pin undergoes relative movement with respect to the second axis in a circular path at an intersection of the first axis and the contact surface of the control piston.

6. The combination as recited in claim 5 wherein the electromagnet coupled to the thrust pin is installed eccentrically relative to the central valve so that the first axis of the thrust pin extends in parallel to and at a distance with respect to the second axis of the control piston.

7. The combination as recited in claim 5 wherein the thrust pin and control piston are arranged and configured with respect to each other such that the relative movement generates a hydrodynamic lubricating film between the contact surface of the control piston and the front face of the thrust pin from adjacent fluid.

8. The combination as recited in claim 5 wherein a front face of the thrust pin is smaller than the contact surface of the control piston.

* * * * *